(12) United States Patent
Hornby et al.

(10) Patent No.: US 7,677,468 B2
(45) Date of Patent: *Mar. 16, 2010

(54) INDUCTIVE HEATED INJECTOR USING ADDITIONAL COIL

(75) Inventors: Michael J. Hornby, Williamsburg, VA (US); John F. Nally, Jr., Williamsburg, VA (US); Hamid Sayar, Newport News, VA (US); Perry Robert Czimmek, Williamsburg, VA (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/691,750

(22) Filed: Mar. 27, 2007

(65) Prior Publication Data

US 2007/0221748 A1 Sep. 27, 2007

Related U.S. Application Data

(60) Provisional application No. 60/786,335, filed on Mar. 27, 2006.

(51) Int. Cl.
*B05B 1/24* (2006.01)

(52) U.S. Cl. .................. 239/135; 239/133; 239/128; 239/585.1; 123/557; 123/549

(58) Field of Classification Search ............ 239/585.1, 239/133, 135, 128; 123/549
See application file for complete search history.

(56) References Cited

U.S. PATENT DOCUMENTS

| | | | | |
|---|---|---|---|---|
| 4,140,476 A | * | 2/1979 | Kaplan | 431/265 |
| 5,040,497 A | * | 8/1991 | Dingle | 123/179.21 |
| 5,487,114 A | * | 1/1996 | Dinh | 381/406 |
| 5,758,826 A | * | 6/1998 | Nines | 239/136 |
| 5,915,626 A | * | 6/1999 | Awarzamani et al. | 239/135 |
| 6,129,073 A | * | 10/2000 | Yamakado et al. | 123/490 |
| 6,315,217 B1 | * | 11/2001 | Park | 239/135 |
| 6,550,458 B2 | * | 4/2003 | Yamakado et al. | 123/490 |
| 6,578,775 B2 | * | 6/2003 | Hokao | 239/135 |
| 6,651,602 B2 | * | 11/2003 | Hiraku et al. | 123/179.21 |
| 2003/0178009 A1 | | 9/2003 | Pellizzari et al. | |
| 2005/0258266 A1 | | 11/2005 | Elia et al. | |

FOREIGN PATENT DOCUMENTS

| | | |
|---|---|---|
| DE | 4431189 | 3/1996 |
| DE | 10057630 | 5/2002 |
| GB | 2307513 | 5/1997 |
| JP | 10238424 | 9/1998 |

OTHER PUBLICATIONS

International Search Report and Written Opinion dated Aug. 28, 2007.

* cited by examiner

*Primary Examiner*—Dinh Q Nguyen

(57) ABSTRACT

A fuel injector assembly includes a first coil that induces a time varying magnetic field into a second coil that is utilized to heat fuel flowing through the fuel injector. The second coil generates a second magnetic field generated by a current induced by the first coil into the second coil. The induced current is generated by an alternating current signal that is interposed onto a direct current signal sent to the first coil. The second coil also is electrically connected to pass current induced from the first coil into a component in thermal contact with the flowing fuel. The current from the secondary coil resistibly heats the component to provide an alternate mode of heating fuel flow.

19 Claims, 2 Drawing Sheets

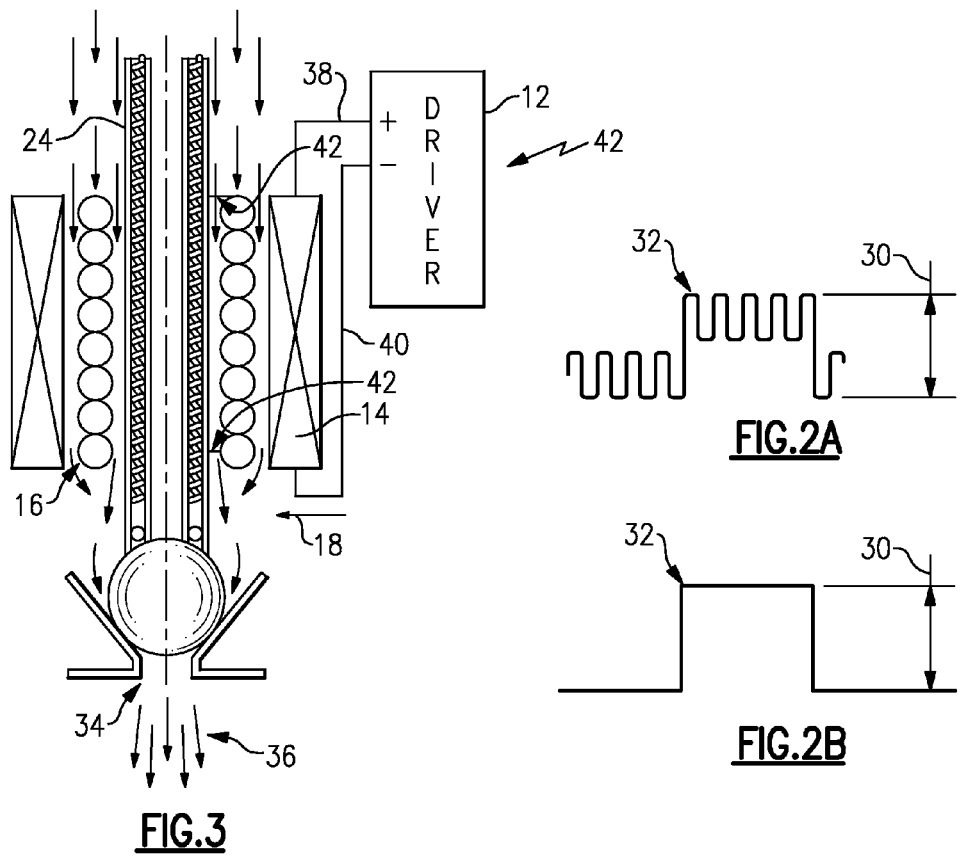
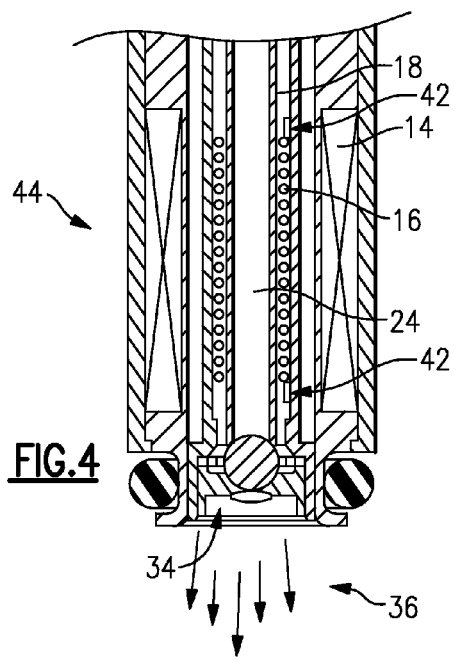

INDUCTIVE HEATED INJECTOR USING ADDITIONAL COIL

CROSS REFERENCE TO RELATED APPLICATION

The application claims priority to U.S. Provisional Application No. 60/786,335 which was filed on Mar. 27, 2006.

BACKGROUND OF THE INVENTION

This invention generally relates to a fuel injector for a combustion engine. More particularly, this invention relates to a fuel injector that heats fuel to aid the combustion process.

Combustion engine suppliers continually strive to improve emission and combustion performance. One method of improving both emission and combustion performance includes heating or vaporizing fuel before injection into the combustion chamber. Heating the fuel replicates operation of a hot engine, and therefore improves combustion performance. Further, alternate fuels such as ethanol perform poorly in cold conditions, and therefore also benefit from pre-heating of fuel.

Various methods of heating fuel at a fuel injector have been attempted. Such methods include the use of a ceramic heater, or a resistively heated capillary tube within which the fuel passes. These methods require electric power and therefore leads that extend through pressure barriers and walls. Seals required between the wires and pressure barriers are a potential source of fuel leakage and are therefore undesirable. Further, such heat generating devices must be insulated from other fuel injector components and therefore are difficult to implement and support within a fuel injector.

Accordingly, it is desirable to design and develop a method of heating fuel without creating additional fuel leak paths, or insulating structures while still providing for the heating and vaporization of fuel.

SUMMARY OF THE INVENTION

An example fuel injector assembly includes a first coil that induces a current into a second coil that is utilized to inductively and resistively heat fuel flowing through the fuel injector.

The example fuel injector includes a primary coil that receives a first signal from a driver to generate a first magnetic field that moves an armature between an open and closed position. A secondary coil is utilized to heat a component in thermal contact with the fuel flow that in turn heats fuel before exiting the fuel injector. The heated fuel exiting the fuel injector assembly is heated to a temperature that substantially vaporizes the liquid fuel to achieve a high level of atomization that in turn improves combustion performance.

The secondary coil generates a second magnetic field generated by a current induced by the first coil into the second coil. The induced current is generated by a second signal that is sent to the first coil in addition to the first signal. The second signal is an alternating current signal that produces a time varying second magnetic field. The frequency of the alternating current that generates the second magnetic field is such that movement of the armature is not induced. The frequency of the alternating current results in a time varying and reversing second magnetic field. The time varying second magnetic field produces a flux flow in the surface of the material that alternates direction to generate heat.

The example second coil also includes an electrical connection to a component in thermal contact with the flow of fuel. The electrical connection transmits a current into an electrically conductive component to induce a resistive heating that combined with the inductively heated component heats and vaporizes fuel within the fuel injector.

Because no hard leads are required to induce the desired second time varying magnetic field, the second coil can be placed within sealed compartments and still provide the desired inductive heating performance.

These and other features of the present invention can be best understood from the following specification and drawings, the following of which is a brief description.

BRIEF DESCRIPTION OF THE DRAWINGS

FIG. 2A is a sketch representing an example drive signal including an alternating current signal interposed on a direct current signal.

FIG. 2B is another sketch representing an example drive signal including only the direct current signal.

FIG. 3 is schematic representation of another example fuel injector assembly.

FIG. 4 is a cross-section of a portion of another example fuel injector assembly.

DETAILED DESCRIPTION OF THE PREFERRED EMBODIMENT

Figure 1:
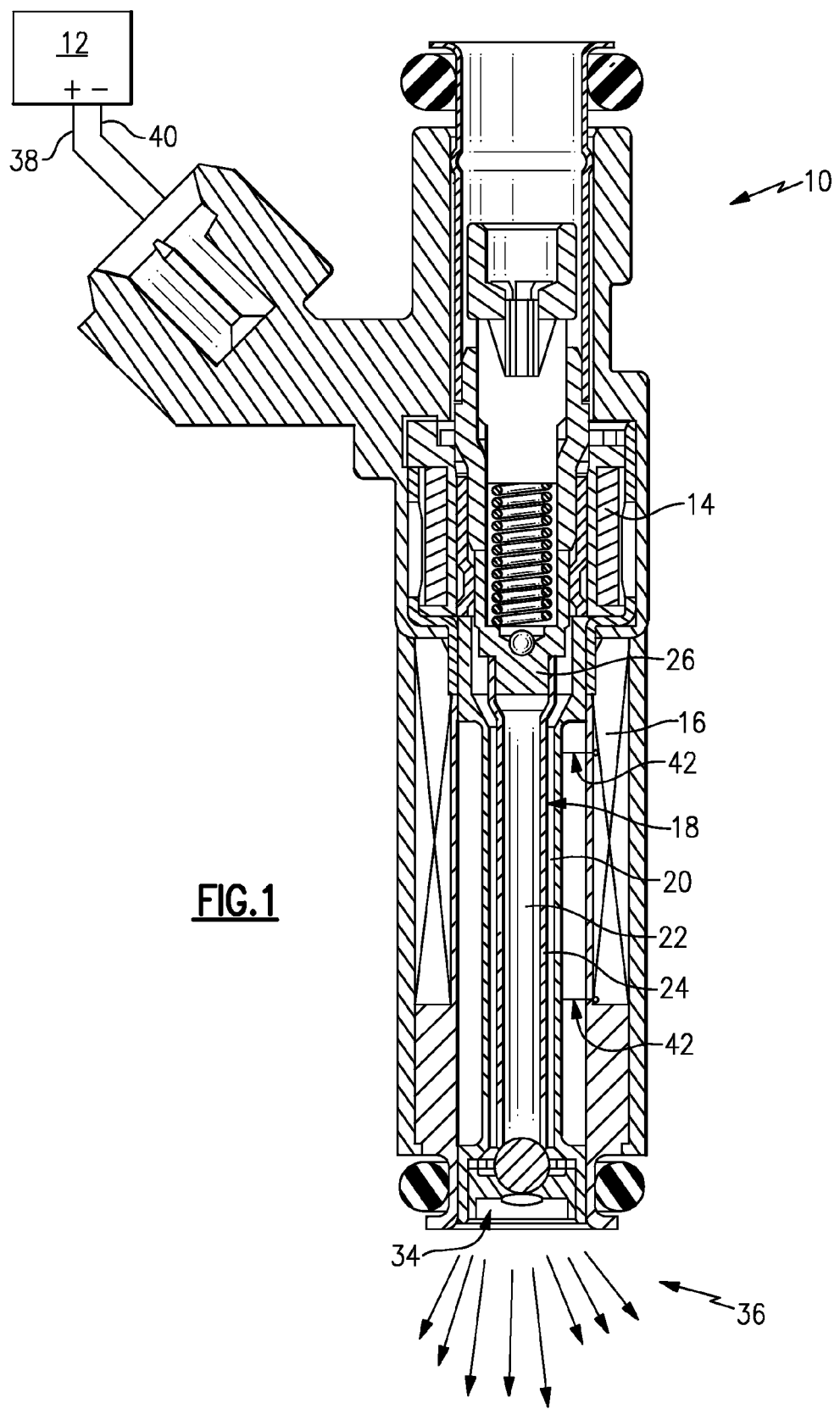
FIG. 1 is a cross-section of an example fuel injector assembly.

Referring to FIG. 1, an example fuel injector 10 includes an annular fuel flow path 24 defined between an armature 26 and a valve body 20. The armature 26 moves within the valve body 20 between an open and closed position to regulate fuel flow 18 through the annular flow path 24. A primary coil 14 receives a first signal from a driver 12 to generate a first magnetic field that moves the armature 26 between the open and closed positions. A secondary coil 16 is axially adjacent the first coil 14 and is utilized to heat a component in thermal contact with the fuel flow 18 that in turn heats fuel before exiting the fuel injector through the outlet 34. The heated fuel exiting the outlet 34 as indicated at 36 is raised to a temperature that substantially vaporizes the liquid fuel to achieve a high level of atomization that in turn improves combustion performance.

The component in thermal contact with the fuel flow 18 in this example is the valve body 20. The valve body 20 includes electrical connections 42 to the secondary coil 16. Current induced in the secondary coil 16 is utilized to resistively heat the valve body 20. The example valve body 20 is fabricated from an electrically conductive material that provides a desired resistance to current from the secondary coil 16. The valve body 20, in turn generates heat in response the amount of current that is generated and applied.

Further, another component in thermal contact with the fuel flow 18 in this example is a portion of the armature 26. The armature 26 includes an armature tube 22 disposed within the fuel flow 18. The armature tube 22 is fabricated from a magnetically active material that responds to a magnetic field. The secondary coil 16 generates the second magnetic field surrounding and interacting with the armature tube 22. The second magnetic field is generated by a current induced by the first coil 14 into the second coil 16. The induced current is generated by a second signal that is sent to the first coil 14 in addition to the first signal. The second signal is an alternating current signal that produces a time varying second magnetic field in the secondary coil 16.

The frequency of the alternating current that generates the second magnetic field is such that movement of the armature 26 is not induced. No movement of the armature 26 is induced because the frequency of the alternating current results in a time varying and reversing second magnetic field. Heat inside the armature tube 22 is generated by hysteretic and eddy-current loses that are induced by the time varying second magnetic field.

Although the armature tube 22 temperature is elevated, the secondary coil 16 remains relatively cool and therefore does not require any special thermal insulation accommodations. The amount of heat generated is determined by the specific resistivity of the material of the armature tube 22 and the magnitude of the second magnetic field. The time varying second magnetic field produces a flux flow in the surface of the material that alternates direction to generate heat. The higher the resistivity of the material the better the generation of heat responsive to the second magnetic field. The specific material utilized for the armature tube 22 is selected to provide the desired generation of thermal energy required to elevate and vaporize fuel within the fuel injector assembly 10.

Accordingly, two heat generation modes occur simultaneously to provide the desired heat required to elevate the temperature of the fuel flow 18. The secondary coil 16 is not electrically connected to any external power source. Instead, and current is induced by the primary coil. The secondary coil 16 thereby provides heating through inductive heating of the armature tube 22 and resistive heating of the valve body 20.

Further, the disclosed example utilizes the armature tube 22 for inductive heating, and the valve body 20 for resistive heating, however other components in thermal contact with the fuel flow 18 could also be utilized for each of the different heating modes.

Referring to FIGS. 2A and 2B, a positive lead 38 and a negative lead 40 are all that is required to generate the desired first and second magnetic fields for the example fuel injector assembly 10. Armature movement is powered by the first magnetic field generated within the first coil 14 by a direct current 30 as is commonly practiced and known. A second alternating current 32 is imposed on the direct current signal 30. The second alternating current 32 is of such a frequency that it does not affect the desired open and closing of the armature 26. Further, the second alternating current signal 32 can be turned off during conditions where heating of the fuel is not desired.

The second alternating current 32 directed to the first coil 14 is utilized to induce the second magnetic field in the second coil 16. As appreciated, by providing a desired ratio of windings between the first coil 14 and the second coil 16 a desired magnitude of the second time varying magnetic field is provided. Further, the alternating current signal 32 interposed onto the first direct current signal 30, generates the desired alternating and time varying magnetic field that generates inductive heating of the armature tube 22 within the fuel flow 18.

Referring to FIG. 3, another example fuel injector assembly 42 includes the second coil 16 nested within the first coil 14. In the nested coil configuration, the first coil 14 and the second coil 16 are coaxially located. The example first coil 14 receives the first direct current signal 30 to generate the first magnetic field that moves the armature 26. The second alternating current signal 32 interposed on the first direct current signal 30 induces the generation of the second magnetic field in the second coil 16. The alternating current in turn generates a time varying and reversing magnetic field that induces heat in the armature tube 22. The temperature of the armature tube 22 is elevated to a level that causes substantial flash boiling and vaporization of the surrounding liquid fuel.

Further, the electrical connections 42 between the valve body 20 and the secondary coil 16 provide a secondary mode of heating the fuel flow 18. The current induced into the secondary coil 16 is directed through the valve body 20. The electrical resistance of the valve body 20 generates heat that is also utilized in heating the fuel flow 18.

Referring to FIG. 4, another example fuel injector assembly 44 includes the second coil 16 disposed within the valve body 20. The valve body 20 provides a sealed cavity through which fuel flows. It is desirable to minimize any potential leak paths as is the purpose of inductive heating. Inducement of the second magnetic field by the first coil 14 provides for the location of the second coil 16 within the sealed valve body 20, and potentially within the fuel flow 18 itself, without creating any additional potential leak paths. The closer proximity of the second coil 16 to the armature tube 22 can provide increases in efficiencies resulting in quicker and greater heat generation.

Further, the electrical connections 42 between the valve body 20 and the secondary coil 16 are within the sealed space and still provide resistive heating. Because the current utilized for resistive heating is induced by the primary coil 14, and not provided by a hardwire connection, the resistive heating function and electrical connections 42 can be disposed within the sealed chamber and still provide the desired dual heating modes of inductive and resistive heating.

Because no hard leads are required to induce the desired second time varying magnetic field, it can be placed within sealed compartments and still provide the desired inductive heating performance. Further, placement of the secondary coil 16 is only limited by the capability of producing a second time varying magnetic field of a desired strength to produce the desired inductive heating to attain the desired level of vaporized fuel.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A fuel injector assembly comprising:
   a first coil for generating a first magnetic field responsive to a first signal; and
   a second coil induced with a current by the first coil through electromagnetic induction; and
   an electrical connection between the second coil and a component, wherein the component is in thermal contact with a fuel flow and generates heat through the electrical connection for heating at least a portion of the fuel flow.

2. The assembly as recited in claim 1, wherein the second coil generates a second magnetic field responsive to a second signal sent to the first coil and at least one component in thermal contact with the fuel flow is heated responsive to the second magnetic field generated by the second coil.

3. The assembly as recited in claim 2, wherein the second magnetic field comprises a time varying magnetic field that induces hysteretic and eddy current loses within the at least one component.

4. The assembly as recited in claim 2, wherein the first signal comprises a direct current and the second signal comprises an alternating current superimposed onto the first direct current signal.

5. The assembly as recited in claim 2, wherein the first signal and the second signal operate independent of each other.

6. The assembly as recited in claim 2, including an armature movable responsive to the first magnetic field for controlling a flow of fuel, wherein a portion of the armature is inductively heated by the second magnetic field.

7. The assembly as recited in claim 1, including an armature movable within a tube that defines an annular fuel flow channel between the armature and the tube.

8. The assembly as recited in claim 1, wherein the second coil is disposed within the fuel flow.

9. The assembly as recited in claim 1, wherein the second coil is nested within the first coil.

10. The assembly as recited in claim 1, wherein the first coil is disposed adjacent the second coil.

11. A method of heating fuel comprising the steps of:
 a) generating a first magnetic field in a first coil responsive to a first signal;
 b) inducing a current in a second coil with the first coil through electromagnetic induction;
 c) electrically connecting at least one component in thermal contact with a fuel flow to the second coil; and
 c) heating the at least one component with current induced in the second coil through the electrical connection.

12. The method as recited in claim 11, including the step of inducing a second magnetic field in the second coil responsive to a second signal transmitted to the first coil.

13. The method as recited in claim 12, including the step of heating the same at least one component or another component with the second magnetic field.

14. The method as recited in claim 13, wherein said step b, comprises generating time varying magnetic field with the alternating current signal that induces hysteretic and eddy current loses within the at least one component to generate heat.

15. The method as recited in claim 11, wherein the second coil is disposed within the flow of fuel.

16. The method as recited in claim 11, wherein the first signal is a direct current signal and the second signal is an alternating current interposed onto the direct current signal.

17. The method as recited in claim 11, including the step of moving an armature responsive to generation of the first magnetic field.

18. The assembly as recited in claim 1, wherein the second coil is not electrically connected to any external source of current.

19. The assembly as recited in claim 11, wherein the second coil is not electrically connected to any external source of current.

* * * * *